US012311508B2

(12) United States Patent
Roberts

(10) Patent No.: US 12,311,508 B2
(45) Date of Patent: May 27, 2025

(54) IMPACT TOOL AND ANVIL

(71) Applicant: MILWAUKEE ELECTRIC TOOL CORPORATION, Brookfield, WI (US)

(72) Inventor: Braden A. Roberts, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/181,257

(22) Filed: Mar. 9, 2023

(65) Prior Publication Data

US 2023/0302611 A1 Sep. 28, 2023

Related U.S. Application Data

(60) Provisional application No. 63/318,193, filed on Mar. 9, 2022.

(51) Int. Cl.
*B25B 21/02* (2006.01)

(52) U.S. Cl.
CPC .................................... *B25B 21/02* (2013.01)

(58) Field of Classification Search
CPC ...................................................... B25B 21/02
See application file for complete search history.

(56) References Cited

U.S. PATENT DOCUMENTS 5,595,099 A 1/1997 Pusateri
7,510,023 B1 * 3/2009 Cheng ..................... B25B 21/02 173/93.5
8,839,879 B2 9/2014 Elger et al.
9,415,498 B2 * 8/2016 Hecht .................. B25D 16/006
9,463,557 B2 10/2016 Seith et al.
9,566,692 B2 2/2017 Seith et al.
10,427,277 B2 * 10/2019 McClung ................ B25B 21/02
10,569,394 B2 2/2020 Seith et al.
(Continued)

FOREIGN PATENT DOCUMENTS

DE 20118029 U1 1/2002
DE 102014209398 A1 11/2015
WO 2011010497 A1 1/2011

OTHER PUBLICATIONS

Extended European Search Report for Application No. 23161035.3 dated Nov. 20, 2023 (10 pages).

*Primary Examiner* — Dariush Seif
(74) *Attorney, Agent, or Firm* — Michael Best & Friedrich LLP

(57) ABSTRACT

An impact tool including a housing, a motor supported within the housing, a camshaft configured to be rotated by the motor, a hammer supported on the camshaft and configured to reciprocate along the camshaft, and an anvil configured to receive intermittent torque application from the hammer, the anvil including an impact receiving portion having a plurality of anvil lugs, a driving end portion opposite the impact receiving portion, the driving end portion configured to be coupled to a tool element, and a stress reducer formed in the impact receiving portion. The hammer is configured to reciprocate along the camshaft and impart rotational impacts to the plurality of anvil lugs, and the stress reducer is configured to dissipate stresses in the impact receiving portion caused by impacts from the hammer.

19 Claims, 4 Drawing Sheets

(56) References Cited

U.S. PATENT DOCUMENTS

| | | | | |
|---|---|---|---|---|
| 2005/0022637 | A1* | 2/2005 | Milbourne | B25B 15/001 81/466 |
| 2005/0022638 | A1* | 2/2005 | Milbourne | B25B 15/001 81/466 |
| 2006/0118316 | A1* | 6/2006 | Clark | B25B 21/02 173/128 |
| 2006/0254789 | A1* | 11/2006 | Murakami | B25B 21/02 173/128 |
| 2009/0014193 | A1* | 1/2009 | Barezzani | B25B 21/026 173/93 |
| 2009/0223690 | A1* | 9/2009 | Sugimoto | B25B 21/026 173/48 |
| 2011/0048751 | A1* | 3/2011 | Elger | B25B 21/026 173/93.5 |
| 2011/0056714 | A1* | 3/2011 | Elger | B25B 21/02 173/128 |
| 2013/0199814 | A1* | 8/2013 | Yew | B25B 21/02 173/211 |
| 2013/0306341 | A1* | 11/2013 | Rudolph | B25B 21/026 173/48 |
| 2017/0259412 | A1 | 9/2017 | Nishikawa et al. | |
| 2019/0009397 | A1* | 1/2019 | Wallman | B25B 27/0035 |
| 2019/0126447 | A1* | 5/2019 | Chu | B25B 21/023 |
| 2019/0275656 | A1 | 9/2019 | Liu | |
| 2020/0039037 | A1 | 2/2020 | McClung et al. | |
| 2020/0061782 | A1* | 2/2020 | Banholzer | B25B 13/465 |
| 2020/0180128 | A1* | 6/2020 | Schneider | B25D 11/068 |
| 2020/0215667 | A1* | 7/2020 | Tamura | B25B 21/026 |
| 2020/0391358 | A1* | 12/2020 | Banholzer | B25B 21/004 |
| 2021/0060741 | A1 | 3/2021 | Kusumoto et al. | |
| 2021/0122014 | A1* | 4/2021 | Liu | B25B 21/02 |
| 2021/0339361 | A1* | 11/2021 | Abbott | B25D 17/06 |
| 2022/0097215 | A1* | 3/2022 | Dales | B25B 21/026 |
| 2022/0111497 | A1* | 4/2022 | Sano | B25B 21/02 |
| 2023/0302611 | A1* | 9/2023 | Roberts | B25B 21/02 |
| 2024/0198499 | A1* | 6/2024 | Teh | B25B 21/026 |

* cited by examiner

IMPACT TOOL AND ANVIL

CROSS-REFERENCE TO RELATED APPLICATIONS

This application claims priority to U.S. Provisional Patent Application No. 63/318,193, filed Mar. 9, 2022, the entire contents of which are incorporated herein by reference.

FIELD

The present disclosure relates to impact tools. More particularly, the present disclosure relates to anvils for impact tools and stress reducing features for such anvils.

BACKGROUND

Impact tools, such as impact wrenches and impact drivers, provide a striking rotational force, and thus intermittent applications of torque, to a tool element or workpiece (e.g., a fastener) to either tighten or loosen the fastener. Impact tools are typically used where high torque is needed such as to tighten relatively large fasteners or to loosen or remove stuck fasteners (e.g., an automobile lug nut on an axle stud) that are otherwise not removable or very difficult to remove using hand tools. Often, high torque is needed in close-quarters (e.g., in small spaces that may be too large for a full sized or large tool) that would be better accessible by a relatively compact impact tool.

SUMMARY

One independent aspect of the disclosure provides an impact tool including a housing, a motor supported within the housing, a camshaft configured to be rotated by the motor, a hammer supported on the camshaft and configured to reciprocate along the camshaft, and an anvil configured to receive intermittent torque application from the hammer, the anvil including an impact receiving portion having a plurality of anvil lugs, a driving end portion opposite the impact receiving portion, the driving end portion configured to be coupled to a tool element, and a stress reducer formed in the impact receiving portion. The hammer is configured to reciprocate along the camshaft and impart rotational impacts to the plurality of anvil lugs, and the stress reducer is configured to dissipate stresses in the impact receiving portion caused by impacts from the hammer.

Another independent aspect of the disclosure provides an impact tool including a housing, a motor supported within the housing, a camshaft configured to be rotated by the motor, a hammer supported on the camshaft and configured to reciprocate along the camshaft, and an anvil configured to receive intermittent torque application from the hammer, the anvil including an impact receiving portion having first and second anvil lugs, a driving end portion opposite the impact receiving portion, the driving end portion configured to be coupled to a tool element, a plurality of flanges disposed between the impact receiving portion and the driving end portion, a first recess extending into the first anvil lug, and a second recess extending into the second anvil lug.

Another independent aspect of the disclosure provides an anvil for an impact tool, including an impact receiving portion having first and second anvil lugs, a driving end portion opposite the impact receiving portion and configured to be coupled to a tool element, a first recess extending into the first anvil lug, and a second recess extending into the second anvil lug.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
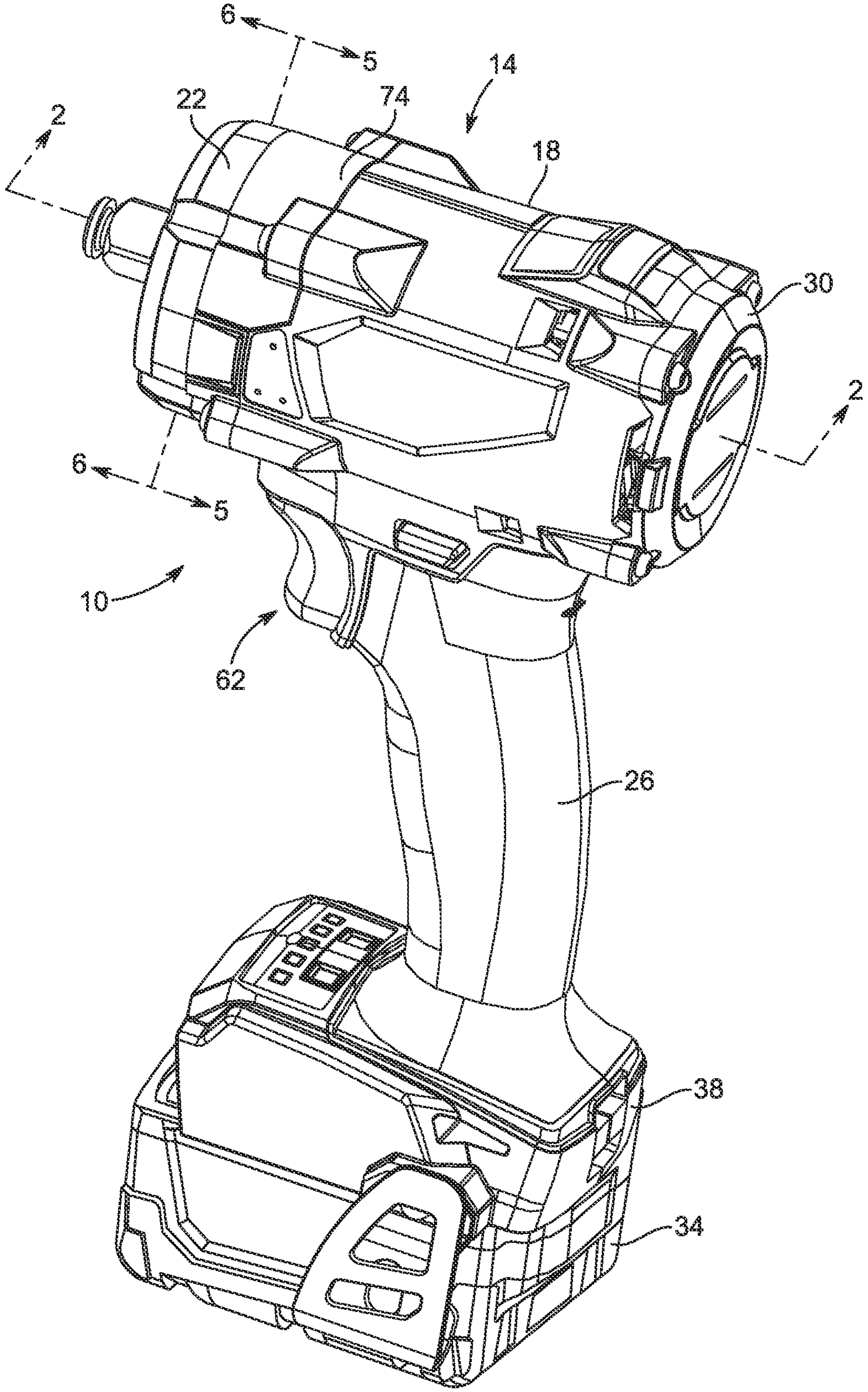
FIG. 1 is a perspective view of an impact tool according to an embodiment of the present disclosure.

FIG. 1 illustrates an impact tool in the form of an impact wrench 10. In some embodiments, the impact wrench 10 is a compact high-torque impact wrench. In the illustrated embodiment, the impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The housing 14 also includes an end cap 30 coupled to the motor housing portion 18 opposite the front housing portion 22.

Figure 2:
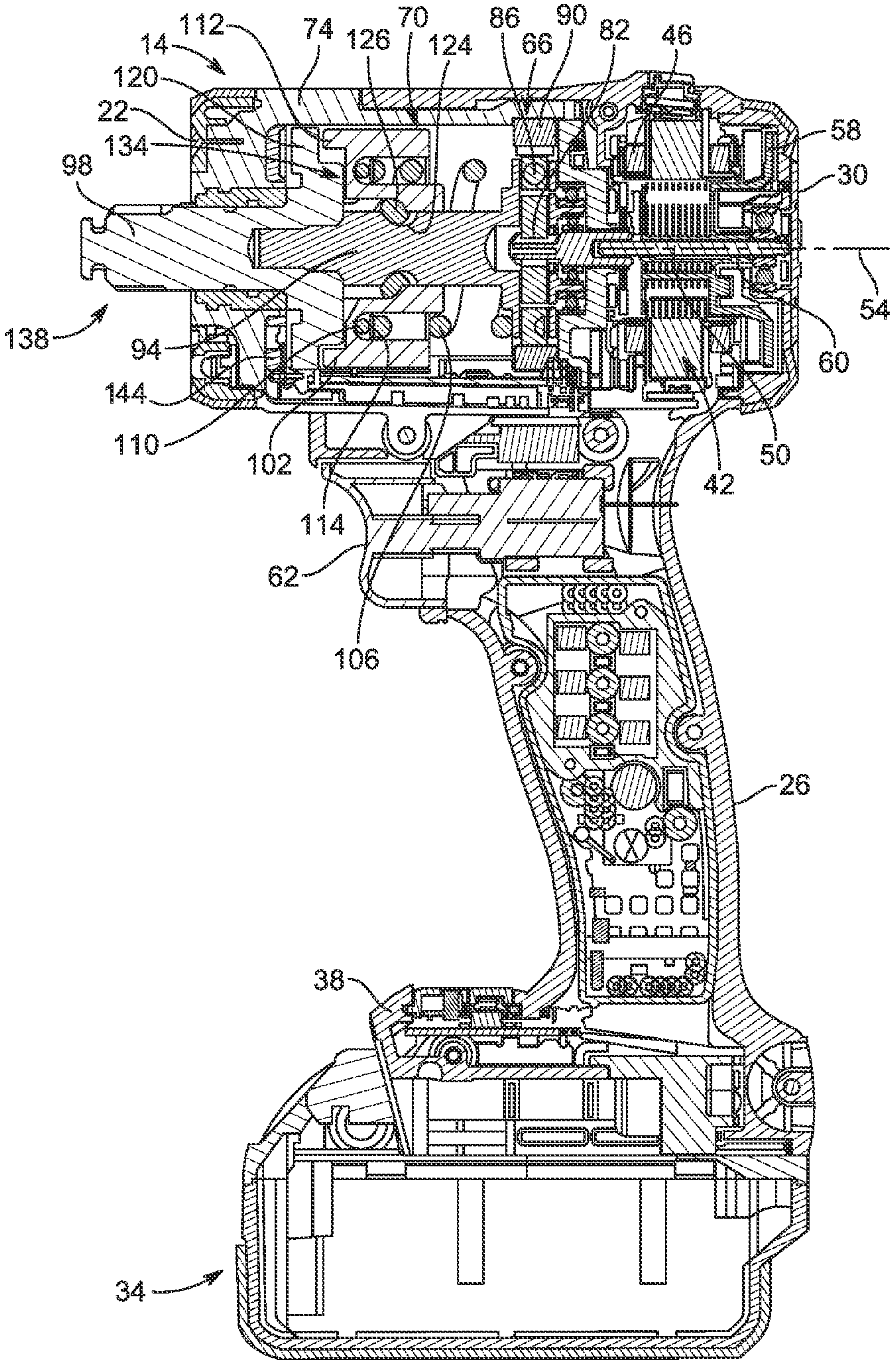
FIG. 2 is a cross-sectional view of the impact tool of FIG. 1, taken along line 2-2 in FIG. 1.

Referring to FIGS. 1 and 2, the impact wrench 10 has a battery 34 removably coupled to a battery receptacle 38 located at a bottom end of the handle portion 26. A motor 42, such as an electric motor, supported within the motor housing portion 18, receives power from the battery 34 via the battery receptacle 38 when the battery 34 is coupled to the battery receptacle 38. In the illustrated embodiment, the motor 42 is a brushless direct current ("BLDC") motor with a stator 46 and an output shaft 50 or rotor that is rotatable about an axis 54 relative to the stator 46. In other embodiments, other types of motors may be used. A fan 58 is coupled to the output shaft 50 (e.g., via a splined member 60 fixed to the output shaft 50) behind the motor 42.

The impact wrench 10 also includes a switch (e.g., trigger switch 62) supported by the housing 14 for operating the motor 42 (e.g., via suitable control circuitry provided on one or more printed circuit board assemblies ("PCBAs") that control power supply and command of the motor 42. In other embodiments, the impact wrench 10 may include a power cord for connecting to a source of AC power. As a further alternative, the impact wrench 10 may be configured to operate using a non-electrical power source (e.g., a pneumatic or hydraulic power source, etc.).

Referring to FIG. 2, the impact wrench 10 further includes a gear assembly 66 coupled to the output shaft 50 and an impact mechanism or drive assembly 70 coupled to an output of the gear assembly 66. The gear assembly 66 may be configured in any of a number of different ways to provide a speed reduction between the output shaft 50 and an input of the drive assembly 70. The gear assembly 66 is at least partially housed within a gear case 74 fixed to the housing 14. In some embodiments, the gear case 74 may be at least partially defined by the front housing portion 22 and/or the motor housing portion 18.

The gear assembly 66 includes a pinion 82 coupled to the output shaft 50, a plurality of planet gears 86 meshed with the pinion 82, and a ring gear 90 meshed with the planet gears 86 and rotationally fixed within the gear case 74. The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94.

The drive assembly 70 further includes an anvil 98 and a hammer 102 supported on and axially slidable relative to the camshaft 94. The anvil 98 extends from the front housing portion 22. A tool element (e.g., a socket, bit, or the like) can be coupled to the anvil 98 for performing work on a workpiece (e.g., a fastener) in various ways. The drive assembly 70 is configured to convert the constant rotational force or torque provided by motor 42 via the gear assembly 66 to a striking rotational force or intermittent applications of torque to the anvil 98 when the reaction torque on the anvil 98 (e.g., due to engagement between the tool element and a fastener being worked upon) exceeds a certain threshold.

With continued reference to FIG. 2, the drive assembly 70 further includes a spring 106 biasing the hammer 102 toward the front of the impact wrench 10 (i.e., in the left direction of FIG. 2). In other words, the spring 106 biases the hammer 102 in an axial direction toward the anvil 98, along the axis 54. A thrust bearing 110 and a thrust washer 114 are positioned between the spring 106 and the hammer 102. The thrust bearing 110 and the thrust washer 114 allow for the spring 106 and the camshaft 94 to continue to rotate relative to the hammer 102 after each impact strike when hammer lugs 112 on the hammer 102 engage with corresponding anvil lugs 120 (FIGS. 5 and 6) on the anvil 98, and rotation of the hammer 102 momentarily stops. The camshaft 94 further includes cam grooves 124 in which corresponding cam balls 126 are received. The cam balls 126 are in driving engagement with the hammer 102 and movement of the cam balls 126 within the cam grooves 124 allows for relative axial movement of the hammer 102 along the camshaft 94 when the hammer lugs 112 and the anvil lugs 120 are engaged and the camshaft 94 continues to rotate.

Figure 5:
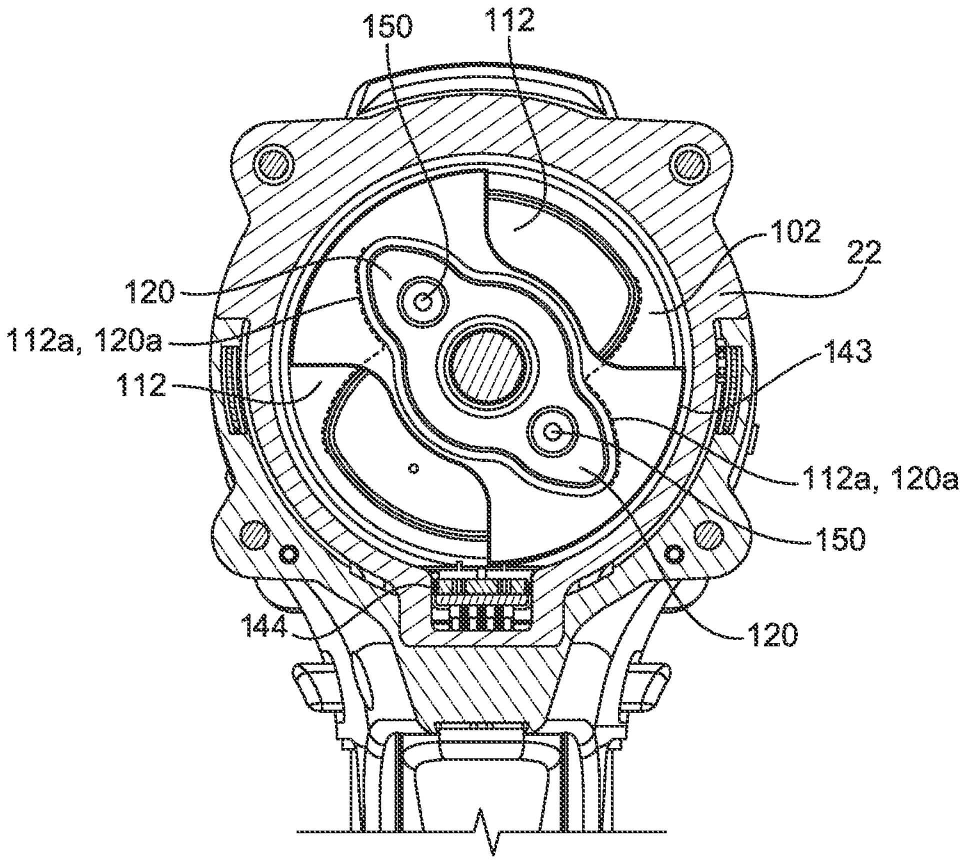
FIG. 5 is a partial cross-sectional view of the impact tool of FIG. 1, taken along line 5-5 in FIG. 1.
Figure 6:
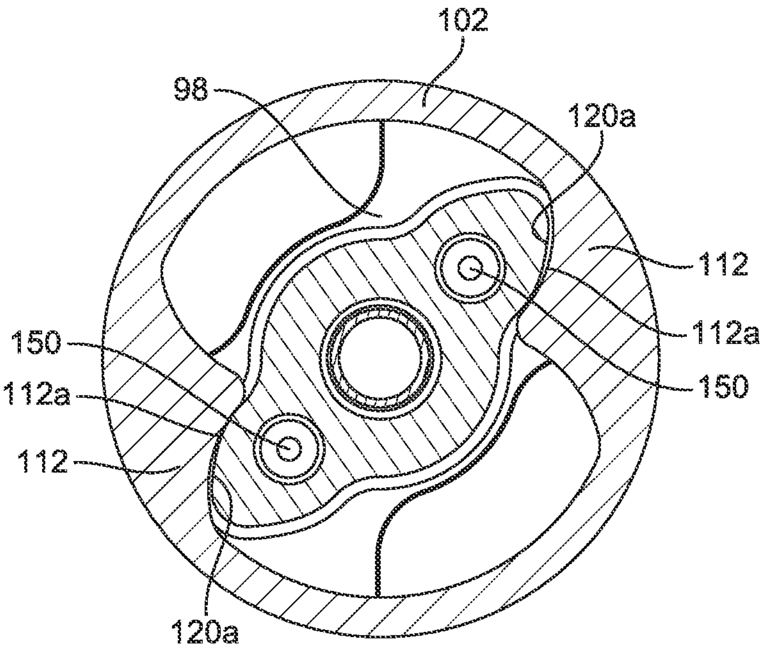
FIG. 6 is a partial cross-sectional view of the impact tool of FIG. 1, taken along line 6-6 in FIG. 1.

In operation of the impact wrench 10, as illustrated in FIGS. 2, 5, and 6, an operator depresses the trigger switch 62 to activate the motor 42, which continuously drives the gear assembly 66 and the camshaft 94 via the output shaft 50. As the camshaft 94 rotates, the cam balls 126 drive the hammer 102 to co-rotate with the camshaft 94, and drive surfaces **112*a* of hammer lugs 112 engage, respectively, driven surfaces 120*a* of the anvil lugs 120 to provide an impact and to rotatably drive the anvil 98 and the tool element. In general, the drive surfaces 112*a* are formed on walls of the hammer lugs 112, and the driven surfaces 120*a* are formed on walls of the anvil lugs 112. After each impact, the hammer 102 moves or slides rearward along the camshaft 94, away from the anvil 98, so that the hammer lugs 112 disengage the anvil lugs 120. As the hammer 102 moves rearward, the cam balls 126 situated in the respective cam grooves 124 in the camshaft 94 move rearward in the cam grooves 124. The spring 106 stores some of the rearward energy of the hammer 102 to provide a return mechanism for the hammer 102. After the hammer lugs 112 disengage the respective anvil lugs 120, the hammer 102 continues to rotate and moves or slides forwardly, toward the anvil 98, as the spring 106 releases its stored energy, until the drive surfaces 112*a* of the hammer lugs 112 re-engage the driven surfaces 120*a* of the anvil lugs 120 to cause another impact. In the illustrated embodiment, the drive surfaces 112*a* and the driven surfaces 120*a*** are complementary curved surfaces.

Figure 3:
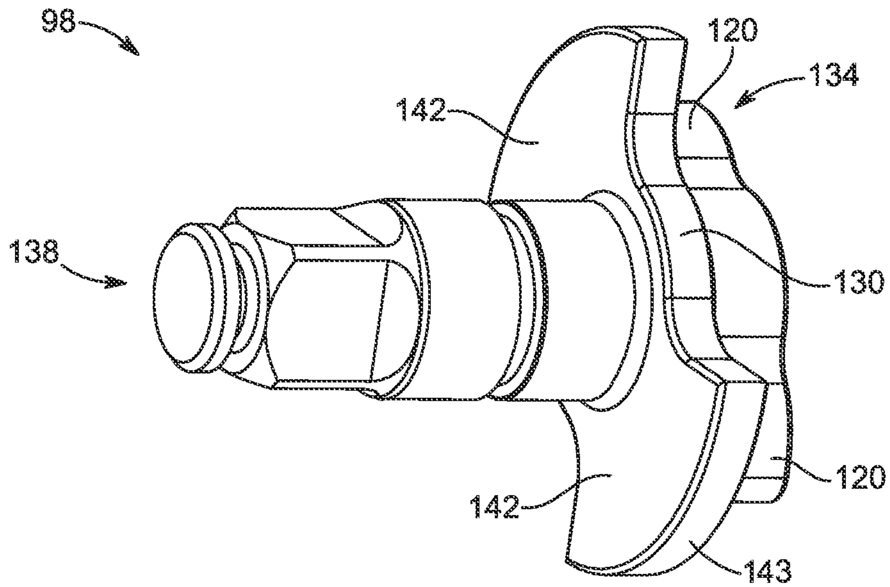
FIG. 3 is a perspective view of an anvil of the impact tool of FIG. 1.
Figure 4:
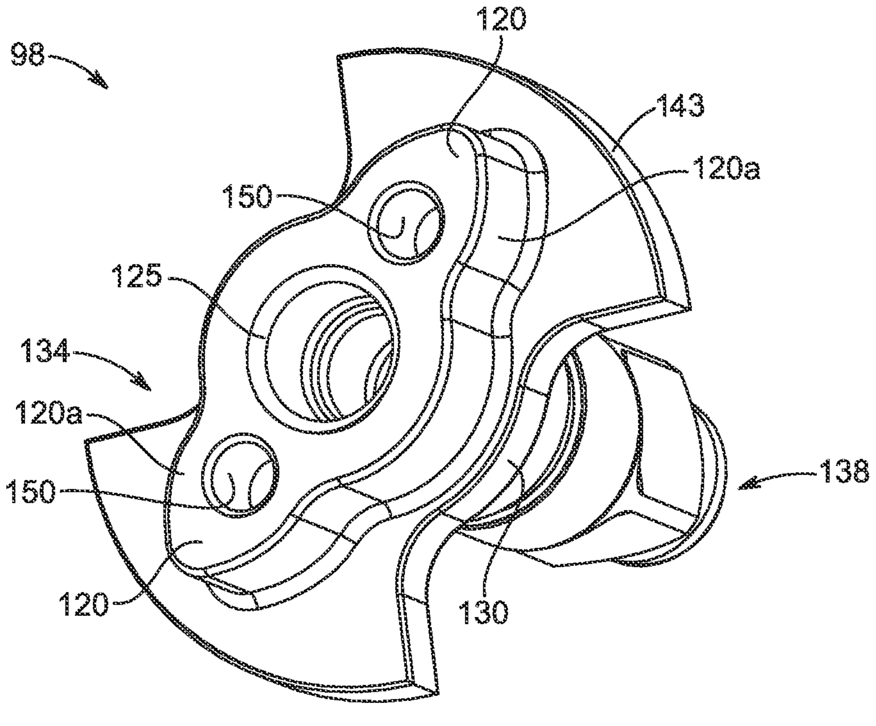
FIG. 4 is another perspective view of the anvil of FIG. 3.

FIGS. 3 and 4 illustrate an embodiment of the anvil 98 in more detail. Although the anvil 98 is described above with reference to the impact wrench 10, the anvil 98 may be incorporated into other rotary impact tools. The anvil 98 includes a body 130 having an impact receiving portion 134, which includes the anvil lugs 120, and a driving end portion 138 opposite the impact receiving portion 134. In the illustrated embodiment, the impact receiving portion 134 includes a central bore 125, which may receive a distal end of the camshaft 94, as shown in FIG. 2, to rotationally support the camshaft 94. The driving end portion 138 of the anvil 98 has a generally polygonal (e.g., square, hexagonal, etc.) cross-sectional shape and is configured to interface with a tool element, so that that the tool element is coupled for co-rotation with the anvil 98. In other embodiments, the driving end portion 138 may have a spline shape, a hexagonal bore, or any other shape suitable for establishing a driving connection with the tool element.

With continued reference to FIGS. 3 and 4, the illustrated anvil 98 includes target flanges 142 formed with the body 130 of the anvil 98 adjacent (e.g., in front of) the anvil lugs 120. In the illustrated embodiment, the target flanges 142 each include a semi-circular portion or surface 143 that is complementary to an inner portion of the front housing portion 22. As illustrated in FIG. 2, a printed circuit board assembly ("PCBA") having one or more sensors 144 (e.g., Hall-effect sensors, inductive sensors, photo-sensors, rotary potentiometers, rotational variable differential transformers ("RVDT"), and/or the like) may be positioned adjacent to the target flanges 142 to detect a rotational position of the target flanges 142 and thereby determine a rotational position of the anvil 98. In some embodiments, a shield (not shown) may be positioned between the target flanges 142 and the anvil lugs 120 to mitigate unwanted magnetic interference caused by the positioning of the hammer lugs 112 proximate the anvil lugs 120 during impact and rotation. In other embodiments, the target flange 142 are omitted from the anvil 98.

With reference to FIGS. 4-6, the anvil 98 further includes stress reducers 150 formed in the impact receiving portion 134, and more specifically in the anvil lugs 120. The stress reducers 150 are configured decrease the rigidity of the anvil lugs 120. Anvils are typically made of a high-strength and high-hardness steel to withstand large impact forces delivered from the hammer lugs 112 to the anvil lugs 120. Such impact forces, over time, may cause damage to the anvil lugs 120, especially the driven surfaces **120*a* receiving the impacts. For example, the anvil lugs 120 may become chipped, broken, or cracked, requiring repair or replacement of the anvil 98. In addition, the target flanges 142 may increase the stiffness of the anvil lugs 120, since the target flanges 142 are directly connected to the anvil lugs 120 in the illustrated embodiment. The increased stiffness may further contribute to damage to the anvil lugs 120** over time.

In the illustrated embodiment, each of the stress reducers 150 includes at least one recess formed in a rearward facing side of the anvil lug 120. The recesses are cylindrical blind bores in the illustrated embodiment, but the recesses may be through-bores in other embodiments and optionally may have other shapes. In some embodiments, each stress reducer 150 may include multiple recesses. The stress reducers 150 are each offset an equal distance from a rotational axis of the anvil 98 in the illustrated embodiment, and are offset from one another by 180 degrees. As such, the stress reducers 150 are positioned on opposite sides of the central bore 125. In addition, the stress reducers 150 are aligned along a plane extending through a crest or tip of each anvil lug 120, such that the stress reducers 150 are centered along the width of each anvil lug 120.

The stress reducers 150 decrease the rigidity of the anvil lugs 120, such that anvil lugs 120 and stress reducers 150 are configured to be slightly resiliently deformed by the rotational impacts from the hammer lugs 112. The inventors have found that this deformation reduces peak stresses in the anvil lugs 120. In addition, by removing material from the anvil 98, the stress reducers 150 also advantageously reduce the weight of the anvil 98.

In some embodiments, the stress reducers 150 reduce a peak shear stress experienced by the anvil lugs 120 by between five percent and fifteen percent, as compared to an identical anvil without the stress reducers 150. This reduction in stress results in an increased estimated life of the anvil 98 from approximately 400,000 cycles to more than 1,000,000 cycles in some embodiments.

Although the disclosure has been described in detail with reference to certain preferred embodiments, variations and modifications exist within the scope and spirit of one or more independent aspects of the disclosure as described. For example, it should be understood that dimensions, materials, and the like of the anvil 98 can be altered for larger or smaller impact tools to accommodate interacting hammers and anvils of a variety of impact tools, such as high torque impact tools and the like. Various inventive features and advantages of the disclosure are set forth in the following claims.

What is claimed is:

1. An impact tool comprising:
- a housing;
- a motor supported within the housing;
- a camshaft configured to be rotated by the motor;
- a hammer supported on the camshaft and configured to reciprocate along the camshaft; and
- an anvil configured to receive intermittent torque application from the hammer to rotate the anvil about an axis, the anvil including
  - an impact receiving portion having a plurality of anvil lugs, the impact receiving portion defining a rear surface of the anvil facing the hammer,
  - a driving end portion opposite the impact receiving portion, the driving end portion configured to be coupled to a tool element,
  - a plurality of flanges disposed between the impact receiving portion and the driving end portion, the plurality of flanges offset from the impact receiving portion along the axis, and
  - a stress reducer formed in the rear surface of the anvil, the stress reducer terminating prior to the plurality of flanges,
- wherein the hammer is configured to reciprocate along the camshaft and impart rotational impacts to the plurality of anvil lugs, and

- wherein the stress reducer is configured to dissipate stresses in the impact receiving portion caused by impacts from the hammer.

2. The impact tool of claim 1, wherein the stress reducer includes a first recess formed in a first anvil lug of the plurality of anvil lugs and a second recess formed in a second anvil lug of the plurality of anvil lugs.

3. The impact tool of claim 2, wherein the impact receiving portion includes a central bore extending through the rear surface, and wherein the first recess and the second recess are disposed on opposite sides of the central bore.

4. The impact tool of claim 2, wherein the first recess and the second recess are cylindrical blind bores.

5. The impact tool of claim 1, further comprising a battery removably coupled to the housing, the battery configured to provide power to the motor.

6. The impact tool of claim 1, wherein the hammer includes hammer lugs, and wherein the hammer lugs each include one or more curved drive surfaces.

7. The impact tool of claim 6, wherein each of the plurality of anvil lugs includes one or more curved driven surfaces complementary to the curved drive surfaces of the hammer lugs, wherein the curved drive surfaces and configured to engage the curved driven surfaces.

8. The impact tool of claim 7, wherein each anvil lug defines a width between the curved driven surfaces, and wherein the stress reducer is centered along the width.

9. An impact tool comprising:
- a housing;
- a motor supported within the housing;
- a camshaft configured to be rotated by the motor;
- a hammer supported on the camshaft and configured to reciprocate along the camshaft; and
- an anvil configured to receive intermittent torque application from the hammer to rotate the anvil about an axis, the anvil including
  - an impact receiving portion having first and second anvil lugs,
  - a driving end portion opposite the impact receiving portion, the driving end portion configured to be coupled to a tool element,
  - a plurality of flanges disposed between the impact receiving portion and the driving end portion, the plurality of flanges extending radially outward of the anvil lugs, the plurality of flanges offset from the impact receiving portion along the axis,
  - a first recess extending into the first anvil lug, and
  - a second recess extending into the second anvil lug.

10. The impact tool of claim 9, wherein the first and second recesses are offset from a rotational axis of the anvil.

11. The impact tool of claim 9, wherein the anvil includes a central bore disposed between the first and second recesses.

12. The impact tool of claim 11, wherein the central bore receives and supports a distal end of the camshaft.

13. The impact tool of claim 12, wherein the hammer includes a plurality of hammer lugs, each of the plurality of hammer lugs including a drive surface formed on one or more walls thereof, and wherein each of the plurality of anvil lugs includes a driven surface formed on one or more walls thereof, the drive surfaces configured to engage the driven surfaces to impart an impact thereto.

14. The impact tool of claim 13, wherein each of drive surfaces and each of the driven surfaces is curved in a complementary manner, and wherein the first and second recesses are configured to resiliently deform in response to an impact imparted by the plurality of hammer lugs against the plurality of anvil lugs.

15. The impact tool of claim 9, further comprising a sensor adjacent the plurality of flanges, the sensor configured to detect a rotational position of the anvil.

16. The impact tool of claim 15, wherein the sensor includes at least one of a Hall-effect sensor, an inductive sensor, and a rotary potentiometer.

17. The impact tool of claim 9, wherein the first recess and the second recess are cylindrical blind bores.

18. An anvil for an impact tool, comprising:

an impact receiving portion having first and second anvil lugs, the impact receiving portion defining a rear surface of the anvil;

a driving end portion opposite the impact receiving portion and configured to couple to a tool element;

a first cylindrical blind bore extending into the rear surface of the first anvil lug; and a second cylindrical blind bore extending into the rear surface of the second anvil lug.

19. The anvil of claim 18, wherein the first and second cylindrical blind bores are offset from a rotational axis of the anvil, wherein the anvil includes a central bore disposed between the first and second cylindrical blind bores, and wherein the anvil includes a plurality of flanges disposed between the impact receiving portion and the driving end portion.

* * * * *